Feb. 13, 1923.

G. S. PERKINS 1,445,550

CONFECTION COATING MACHINE

Filed Feb. 5, 1921

INVENTOR
George Simpson Perkins.
BY Chapin + Neal
ATTORNEYS

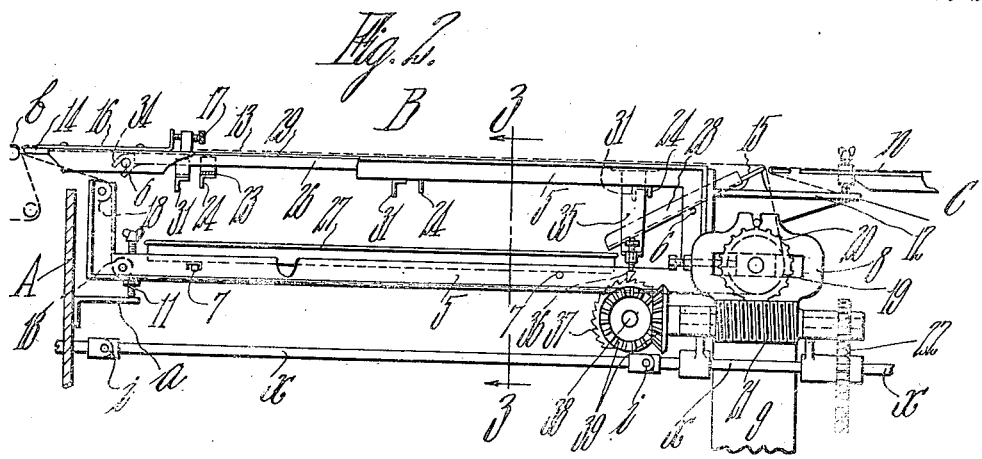
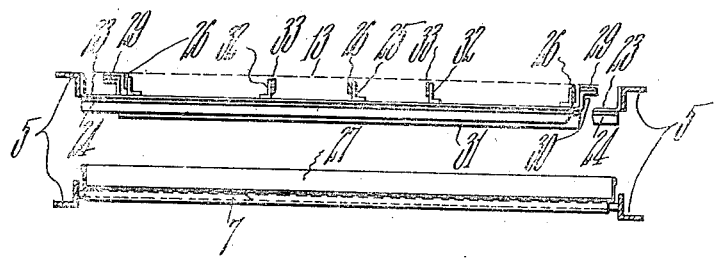
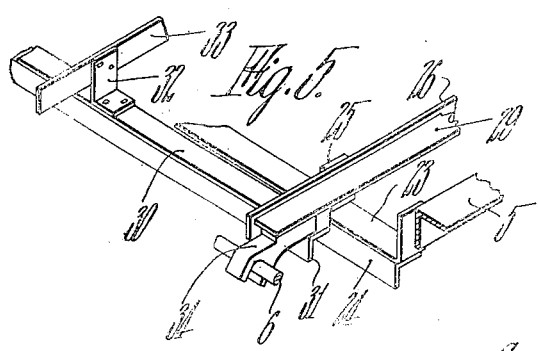

Patented Feb. 13, 1923.

1,445,550

UNITED STATES PATENT OFFICE.

GEORGE SIMPSON PERKINS, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

CONFECTION-COATING MACHINE.

Application filed February 5, 1921. Serial No. 442,799.

*To all whom it may concern:*

Be it known that I, GEORGE SIMPSON PERKINS, citizen of the United States, residing at Springfield, in the county of Hampden and State of Massachusetts, have invented new and useful Improvements in Confection-Coating Machines, of which the following is a specification.

This invention relates to improvements in confectionery coating machines and, more particularly, to machines which are adapted to apply a second coating to an article, previously coated with another kind of material.

The improved coating machine is capable of use with articles, which have been previously coated in various ways or have had deposited thereon various substances. As an illustrative example of one specific use, the machine is adapted to coat with chocolate, or the like, cakes, or other confections, which have had previously deposited thereon a layer of marshmallow and later a sprinkling of shredded cocoanut, chopped nuts, or other more or less finely divided solid material.

Such material may be applied by sprinkling it over the articles by hand, or by special machinery adapted for this purpose, but in either case, it is very difficult to prevent some of the shreds or finely divided material from being carried into the chocolate coating machine on the feed belt. Even if the material all lodges on the articles (which is most unlikely), some of it will, during the travel of the articles to the chocolate coating machine, fall therefrom and lodge upon the feed belt. Such material as lodges on the feed belt, will, when the articles are transferred to the pervious coating belt, fall therethrough into the tank, which contains the chocolate or like coating material. Thus, an admixture of two coating materials results which is undesired. The mixing of foreign material with the chocolate coating, whether or not such material is solid, has the obvious disadvantage of adulteration of the coating. Moreover, when the foreign material is non-fluid and of the general character defined, it interferes with the operation of the machine by clogging up various parts, such as the discharge openings in the shower pan and by generally gumming up all the working elements of the machine. Furthermore, chocolate, or like coating, having solid material therein, produces a rough coating with an undesired unfinished appearance. Aside from these difficulties, trouble occurs when the coating machine is used for a "run" of another kind of centers, such as ordinary cream centers, which are supposed to have a smooth glossy coat of pure chocolate unadulterated by other materials.

This invention is concerned with, and has for its general object, the provision of means, in connection with a coating machine, for the prevention of the adulteration of the coating material by the mixing therewith of other substances which would ordinarily be carried into the machine by the feed belt.

More particularly, it is an object of the invention to provide as an adjunct to, or as a substitute for, article feeding mechanism of a confectionery coating machine, a pervious, and preferably vibratory, table over which the articles must travel to reach the pervious coating belt or support and by which all loose material on the articles is removed as well as any material carried along between the articles.

A further object of the invention is to provide a machine for coating articles with one kind of material, a feeding conveyer by which articles having a coating of another kind of material are carried to the machine, and a pervious vibratory table between the conveyer and the machine, over which the articles are carried and by which excess coating of the second material is removed prior to the coating of the articles with the first material.

Other objects and advantages will appear in the following description and in the illustrative embodiment of the invention in the accompanying drawings, in which—

Fig. 2 is an enlarged elevational view, with parts broken away, of the pervious vibratory table over which the articles are carried to the coating machine;

Fig. 3 is a cross sectional view taken on the line 3—3 of Fig. 2;

Fig. 4 is a diagrammatical view illustrative of another relative positioning of certain parts shown in Fig. 3; and Fig. 5 is a fragmentary perspective view of part of the supporting and vibrating means for the pervious table.

Figure 1:
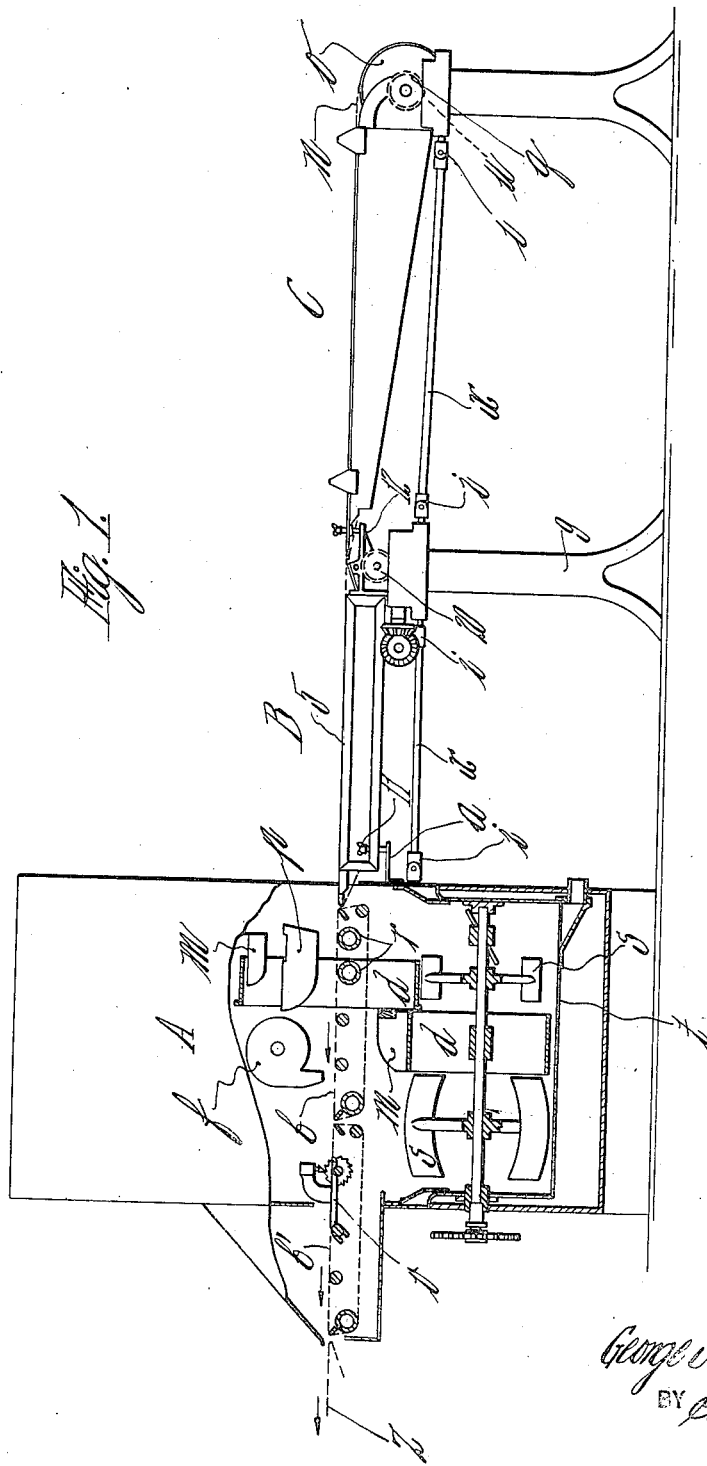
Fig. 1 is an elevational view, partly in section, of a coating machine embodying the invention.

Referring to the drawings and particularly to Fig. 1,—A represents the confectionery coating machine, which may be variously constructed, as desired. The particular coating machine shown herein, as an illustrative example, of one suitable type, is of the general type disclosed in U. S. Letters Patent No. 790,184 granted May 16, 1905 on an invention of Gabriel Carlson.

This type of machine includes a main supply tank $t$ for the coating material, located in the base of the casing. From tank $t$ the coating is conveyed to a shower pan $p$ from which it falls in a stream upon the articles to be coated and envelops them. These articles are supported, during the coating operation, upon a pervious support,—in this instance a belt $b$, of open work or wire mesh construction, which travels in the illustrated direction and overlies tank $t$, whereby excess coating may pass through the belt and be returned to the tank. Excess coating on the coated articles may be removed, as by a blower or fan $f$. The bottom coating may be applied by a pair of bottoming rolls $r$, which pick up some of the excess coating, carry it upward and apply it to the bottoms of the articles. The applied coating is preferably smoothed by subjecting the articles to a slight shaking action, while on the coating belt, or on a second similar belt $b'$ mounted as a continuation thereof, which action is accomplished by a vibratory frame $v$. As to the remaining elements of the machine, $s$ represents stirrers in tank $t$; $d$ the drums for conveying coating from tank $t$ to shower pan $p$; and $m$, scrapers cooperating with the drums $d$ to transfer the coating in the manner of the Carlson patent, above identified, to which reference is also made for a more complete disclosure of the detailed construction and operation of the elements above briefly described. The coated articles are transferred from belt $b$ to belt $b'$ and thence to a belt $z$, which usually carries paper plaques and may be constructed and arranged in the general manner disclosed in U. S. Letters Patent No. 717,970 granted January 6, 1903 on an invention of Gabriel Carlson.

Many other suitable types of coating machines are known, many of which may be used in place of the particular one herein disclosed, as this invention is largely independent of the particular details of the coating machine. The invention may be used with any coating machine, wherein the articles are supported during the coating operation on a pervious or open-work support and wherein excess coating returns through such support to the supply tank, and it is not essential for all purposes that this support move, as the articles may be moved along it by other means.

The unit B, as shown in Fig. 1, represents the pervious vibratory table, with which this invention is particularly concerned, and the unit C represents a conveying mechanism to carry articles to the unit B. Unit C, includes a belt $n$ driven by a roll $o$, which may be driven by a worm gear $q$ and worm $u$, and the latter may be driven by means of shafts $x$, preferably including universal joints $i$, from the coating machine A. The unit C may, for example, comprise a simple feed belt, as shown in U. S. Letters Patent No. 735,890 granted August 11, 1903 on an invention of E. P. F. Magniez, or it may be constructed after the manner disclosed in U. S. Letters Patent #791,243 granted May 30, 1905 on an invention of Gabriel Carlson, or in any other suitable manner.

The unit C, according to this invention, merely serves as an example of one of many ways in which confections can be carried to the unit B.

Generally, although not necessarily so far as all features of the invention are concerned, the articles to be coated in machine A have been previously treated in a separate machine,—such for example as a depositor,—and have had applied thereto a layer, or deposit, of some substance, such for example as marshmallow. Articles, so treated, are transferred either automatically, or by hand, to the unit C and are then coated with more or less finely divided solids, of which shredded cocoanut and chopped nuts are representative examples. This last-named coating operation may be accomplished by hand, or otherwise, as by means incorporated into the depositing machine. In the latter case, the conveyer of the depositing machine may deliver the articles to the unit B directly and such conveyer is to be regarded as the equivalent of the belt $n$ of unit C.

The unit B will now be described in detail with especial reference to Figs. 2 to 5 inclusive. It includes two spaced side frames 5, suitably tied together by upper and lower cross bars 6 and 7, respectively. These side frames are connected at one end to a frame 8, which in turn is supported from the floor by a pedestal 9. At the other end each side frame 5 overlies a bracket $a$, on the casing of machine A, and is supported thereby, preferably in an adjustable manner, as by screws 11, by means of which the frame may be raised or lowered slightly to align the pervious, vibratory table to be described with belt $b$. The frame 8 carries a bracket 12, whereby to support one end of the feed unit C in a similar manner so that belt $n$ may be aligned with the table now to be described.

This table, as shown, consists of a coarse mesh, woven wire, endless belt 13, which may be similar in construction to the belt $b$. The upper lap of this belt 13 is substantially horizontal and extends between two thin cross bars 14 and 15, the former being longitudinally adjustable relatively to frames 5 and the latter suitably fixed thereto. The bar 14 has fixed thereto at each end a strip 16, which is slidably mounted on the top of the adjacent side frame 5, and is longitudinally movable by a screw 17 supported from frame 5. The belt 13 also is engaged by guide rolls 18 and by a larger roll 19, which latter is preferably adjustably mounted in frame 8, as indicated in Fig. 2.

The roll 19 constitutes a driving roll, whereby belt 13 may, in addition to its main function, serve also as a conveyer, thus dispensing with other means for this purpose, which means may however, be used if desired, as roll 19 need not be driven. Upon the shaft of the latter is a worm gear 20, which is driven by a worm 21, revolubly mounted on bracket 8 and driven from one of the described shafts $x$, as by the intermeshing spur gears 22.

Preferably, additional supporting means are provided for the upper lap of belt 13. A series (three as shown) of cross bars 23 extend between, and are secured at their ends to, the side frames 5 and underlie the upper lap of belt 13. Each bar 23 may be further strengthened by an angle iron 24 secured to the under face thereof. Supported from the bars 23, as by brackets 25, are a series (three as shown) of bars 26, which are longitudinally disposed in parallel relation with frames 5 and support the belt 13 upon their upper edges, as clearly shown in Fig. 3.

Underlying the upper lap of belt 13, is a receptacle 27, which is supported by the lower cross bars 7 and is removable through the openings provided in frames 5. In the present case, it is not convenient to have receptacle 27 underlie the entire longitudinal extent of belt 13, and therefore, a supplementary receiving means, in the nature of a trough 28, is provided, which trough delivers into receptacle 27 and may be supported by the bar 15.

For the purpose of shaking the upper lap of belt 13 a vibratory frame is provided, which underlies the belt and is preferably effective upon a considerable area thereof. This frame includes two flat side bars 29, which are disposed one adjacent each side frame 5. These two bars 29 are connected together at intervals by a series, as three, cross bars 30, which may be reenforced by angle irons 31. Supported from these bars 30, as by angles 32, and disposed between the middle and each outer support 26, are additional bars 33 which parallel the side bars 29.

The vibratory frame, thus formed, is pivotally supported at one end, as by forked members 34 which are attached at one end to the side bars 29 and have their forked ends straddling one of the upper cross bars 6, preferably that one adjacent to the coating machine A. At the other end, the frame is supported,—through the intermediary of brackets 35 attached to, and depending from bars 29, and pawls 36 adjustably mounted in such brackets,—from ratchets 37. The latter are fixed to a cross shaft 38, which is rotatably supported from frames 5 and driven by bevel gears 39 from the worm 21. The pawls 36 are so adjusted that, when they are engaged with the bottoms of the ratchet teeth; the upper edges of bars 29 and 33 lie in a plane at least slightly below that of belt 13 and its supporting bars 26, as shown in Fig. 3, and, when the pawls are engaged with the tops of the ratchet teeth, the upper edges of bars 29 and 33 will lie above the bars 26. Thus, belt 13 may be lifted above its supporting bars 26 and then suddenly released and allowed to drop upon these bars, thereby shaking the belt. The degree of shaking may be varied by adjustment of pawls 36.

In operation, confections, such for example as cakes, are covered with the desired material, such as cocoanut or the like, and transferred to belt 13. The cakes also usually have applied thereto a deposit of some other substance, such as marshmallow, before the coating, just described, is applied. Some of the cocoanut, or other like material, will adhere to this previously made deposit but, generally, some is loose and it is these loose particles which are shaken off by the up and down movement imparted to belt 13. These particles, together with those carried in on the conveyer, such for example as belt $n$, pass through the belt 13 and are received in the receptacle 27. The material received in the latter is thus saved for subsequent use in coating other cakes and, what is more important, is prevented from passing into the coating machine and mixing with the coating in tank $t$.

Although the invention has been described in one of its specific uses, such use has been set forth merely as an illustrative example. Other kinds of confections fed to belt $n$, may be accompanied with loose material which should be prevented from falling into tank $t$ and the invention is equally useful for this purpose.

The invention has been disclosed herein, in an embodiment at present preferred, for illustrative purposes but the scope of the invention is defined by the appended claims rather than by the foregoing description.

What I claim is—

1. In combination with a confectionery coating machine, a pervious conveying means to carry articles to be coated thereto and permit loose particles carried therewith to fall therethrough before reaching the machine, and means underlying said conveying means to impart a shaking movement thereto.

2. In combination with a confectionery coating machine, pervious conveying means to carry articles to be coated thereto, and rapping means acting on said conveying means intermediate its ends to impart a shaking movement thereto.

3. In combination with a confectionery coating machine, pervious conveying means to carry articles to be coated thereto, and means to impart a shaking movement to said conveying means.

4. In a coating machine, a supply tank for the coating material, a pervious support mounted above said tank and arranged to support the articles during coating, means to deliver coating material from said tank and apply it to the articles on said support, a pervious support adjacent the first support and upon which the articles travel to the latter, and means to impart a shaking movement to the second support.

5. In a coating machine, a supply tank for the coating material, a pervious support mounted above said tank and arranged to support the articles during coating, means to deliver coating material from said tank and apply it to the articles on said support, a pervious conveyer to carry the articles to be coated to said support, and means to impart a shaking movement to said conveyer.

6. In combination, means to coat articles with chocolate or the like, feeding and supporting means to carry articles previously coated with another substance to said coating means, said second means including a pervious table, and means to shake said table to remove excess coating of said substance.

7. In combination, means to coat articles with chocolate or the like, feeding and supporting means to carry articles previously coated with another substance to said coating means, said second means including a pervious table, means to shake said table to remove excess coating of said substance, and receiving means below said table for said excess coating.

8. A feeding unit for a confectionery coating machine, comprising, a frame, a pervious conveyer mounted therein, means for supporting the frame with one end of said conveyer in close proximity to the coating conveyer of said machine, a rapping frame mounted in said frame beneath said conveyer to vibrate it, and a receptacle supported in the first-named frame below said conveyer and rapping frame.

9. An attachment for confectionery machines, comprising, a frame, a pervious conveyer mounted therein, means for supporting said frame including means for adjusting one end of said conveyer into alignment with the receiving end of the conveyer of said confectionery machine, and a receptacle supported by said frame below the pervious conveyer to receive particles falling therethrough.

10. An attachment for confectionery machines, comprising, a frame, a pervious conveyer mounted therein, means for supporting said frame including means for adjusting one end of said conveyer into alignment and close proximity with the receiving end of the conveyer of said confectionery machine, and a rapping frame to impart a shaking movement to said conveying means.

In testimony whereof I have affixed my signature.

GEORGE SIMPSON PERKINS.